Patented July 24, 1923.

1,463,037

UNITED STATES PATENT OFFICE.

CAMILLE DEGUIDE, OF ENGHIEN, FRANCE.

PROCESS FOR THE MANUFACTURE OF ALKALI-METAL SILICATES.

No Drawing.   Application filed December 24, 1921.   Serial No. 524,695.

*To all whom it may concern:*

Be it known that I, CAMILLE DEGUIDE, a subject of the King of Belgium, and a resident of Enghien, Seine et Oise, France, have invented new and useful Improvements in a Process for the Manufacture of Alkali-Metal Silicates, of which the following is a specification.

This invention relates to a process for the manufacture of alkali-metal silicates. It is based upon the applicant's discovery that the silicates of barium, instead of being stable compounds, as is generally admitted, are on the contrary unstable in presence of water and alkali metal carbonates or sulphates.

The process according to the present invention consists in decomposing a silicate of barium by water and an alkali-metal carbonate or by water and an alkali-metal sulphate.

(a). The process may start, for example, from monobarytic silicate; the latter, in a very finely divided state is placed in suspension in water containing in solution an alkali-metal carbonate or sulphate. The temperature is raised, for example by the injection of steam, to about 80° C.; one of the following reactions then takes place:—

$SiO_2.BaO + xH_2O + Na_2CO_3 = Na_2SiO_3 + BaCO_3 + xH_2O.$  (1)
$SiO_2.BaO + xH_2O + Na_2SO_4 = Na_2SiO_3 + BaSO_4 + xH_2O.$  (2)

Similar reactions are obtained with other alkali-metal carbonates or sulphates.

The alkali-metal silicates in solution are separated from the precipitated barium carbonate or sulphate by decantation or filtration; they are then concentrated, if necessary.

(b). Bibarytic silicate, in a very finely divided state, is placed in suspension in water containing alkali-metal carbonates or sulphates. One of the following reactions takes place:

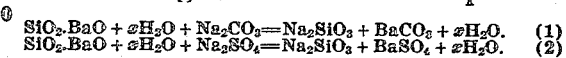
$SiO_2.2BaO + xH_2O + 2Na_2CO_3 =$
  $Na_2SiO_3 + 2NaOH + 2BaCO_3 + (x-1)H_2O.$  (3)
$SiO_2.2BaO + xH_2O + 2Na_2SO_4 =$
  $Na_2SiO_3 + 2NaOH + 2BaSO_4 + (x-1)H_2O.$  (4)

The same reactions take place with other alkali-metal carbonates or sulphates. Here again the soluble portion is separated from the precipitate by decantation or filtration.

(c). It is evident that if the reaction were started from a silicate intermediate between the monobarytic and bibarytic silicates (that is, a mixture of monobarytic silicate and barium oxide) or a silicate intermediate between the bibarytic and tribarytic silicates, and so on, there would always be obtained a mixture of alkali-metal silicate and alkali metal hydrate, as well as barium carbonate or sulphate.

In order to produce the different silicates of barium, necessary for carrying out the process, one of the following methods may be adopted:

(1) In a tunnel furnace or rotary furnace there is calcined at about 1300–1400° C., a mixture of silica and barium carbonate:

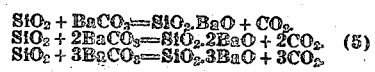
$SiO_2 + BaCO_3 = SiO_2.BaO + CO_2.$
$SiO_2 + 2BaCO_3 = SiO_2.2BaO + 2CO_2.$  (5)
$SiO_2 + 3BaCO_3 = SiO_2.3BaO + 3CO_2.$ There is thus obtained a silicate of barium, more or less basic, according to the proportions of the elements. In case the furnace yields a silicate of too great basicity, for example a tribarytic silicate, the latter can be restored to the state of monobarytic silicate by treating it with hot water; the excess of barium hydrate is thus eliminated and can be recovered.

(2) Silica may be calcined with a mixture of barium sulphate and carbon; one of the following reactions takes place:

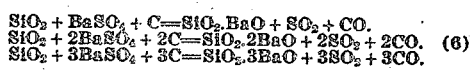
$SiO_2 + BaSO_4 + C = SiO_2.BaO + SO_2 + CO.$
$SiO_2 + 2BaSO_4 + 2C = SiO_2.2BaO + 2SO_2 + 2CO.$  (6)
$SiO_2 + 3BaSO_4 + 3C = SiO_2.3BaO + 3SO_2 + 3CO.$ These reactions can be carried out in a rotary cement kiln or tunnel furnace, at about 1400–1500° C.; here again if the barium silicate obtained is found to be too basic, it can be washed with hot water after stirring, so as to extract and if desired utilize the barium hydrate, which constitutes a by-product of great value.

In these different methods of procedure, indicated above at (a), (b) and (c), the barium silicates can be constantly regenerated by adding silica, as indicated in the reactions (5), to the barium carbonate obtained by the reactions (1) and (3), or by adding silica and carbon, as indicated in the reactions (6), to the barium sulphate obtained according to the reactions (2) and (4), and carrying the mixture to a temperature of 1300 to 1500° C., in a tunnel or rotary furnace.

The process of manufacture of alkali-metal silicates, which forms the subject of the present invention, can thus be carried out in a continuous manner. The alkali metal silicates obtained may be utilized as such in member 36, as shown herein, globular in form comprising an enlarged chamber 27. This has the effect of slowing the velocity of the stream of incoming gas as it passes through the chamber, with the result that the larger particles of unevaporated liquid will, under the influence of gravity, tend to fall back, resulting in their being thrown to the side and against the walls of heated member 36.

The advantages of my invention will be obvious. Its greatest use is in connection with the burning of liquid fuels of a relatively heavy character, such as kerosene, crude oil, and various forms of distillate. Such fuels are hard to break up into gaseous form, and tend to pass from the carbureter in small particles or drops. If these unevaporated particles reach the manifold and the engine cylinders, flooding and serious engine trouble may result. It is obvious that the heating member 36, being in the main stream of the entire exhaust, will be heated very hot so that any particles of liquid striking the same, will be instantly vaporized, such evaporation resulting in keeping the temperature of the heating member down sufficiently to prevent preignition. It is not, however, desirable at all times or speeds with any given fuel, or at all with some fuels, to employ the heating member 36. Under such circumstances with the double exhaust device and the cock 18, hand controlled through arm 30 and connecting member 31, it is always possible to cut out the heating of member 36 whenever desired, and also to any degree desired, for it is clear that the portion 19 of cock 18 may be made to cover completely the opening either from pipe 14 or bend 16, or may be made to cover more or less each of said openings, resulting in a greater or less flow of hot gases through pipe 14 and heating member 36. At high speeds when the weight of the mixture going to the cylinders in proportion to its volume should be as great as possible, it is usually desirable to cut out the heater entirely, unless the fuel used is so heavy that the heater can be advantageously used in breaking up the heavy particles passing through pipe 24 and precipitated against the interior walls of chamber 27.

I claim:

An intake device for gas engines comprising an exhaust pipe formed in two interconnected sections, one of said sections being connected with the cylinders of the engine, an intake manifold secured upon the other section and having a connection with the carbureter extending through and surrounded by said other section, and controllable means for causing varying quantities of the exhaust gases to pass through said last mentioned pipe section.

In testimony whereof I affix my signature.

ASHLEY C. BENNETT.